No. 893,116. PATENTED JULY 14, 1908.
G. E. WALTON.
SHIP.
APPLICATION FILED JULY 16, 1907.
3 SHEETS—SHEET 1.
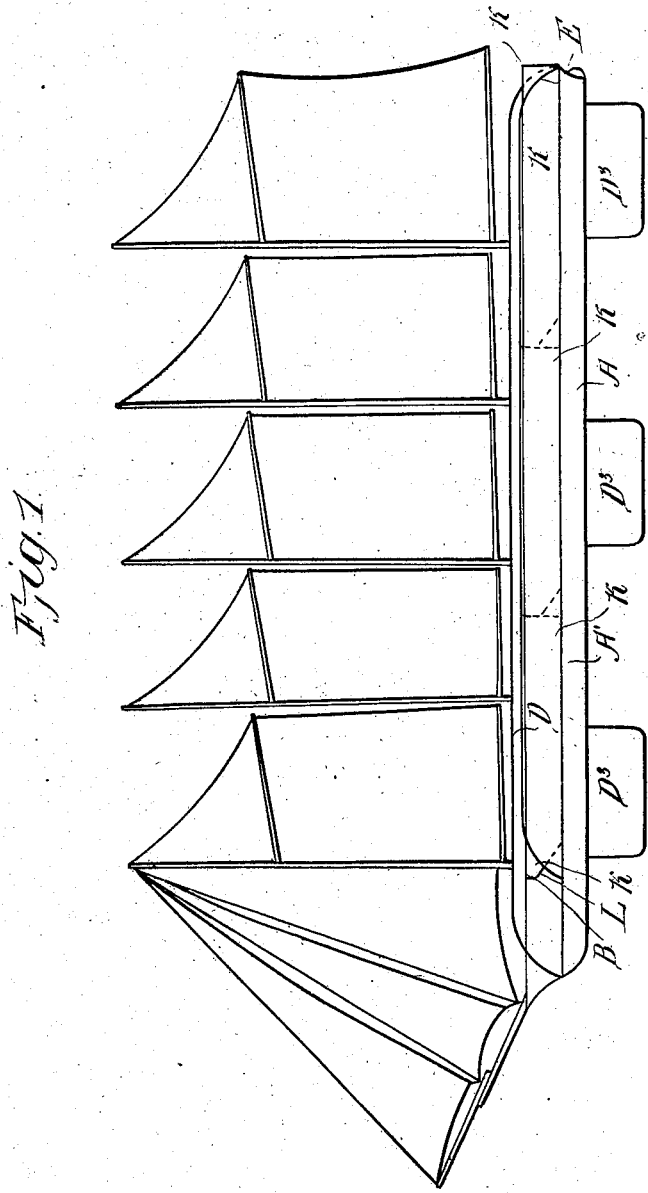

No. 893,116. PATENTED JULY 14, 1908.
G. E. WALTON.
SHIP.
APPLICATION FILED JULY 16, 1907.
3 SHEETS—SHEET 2.
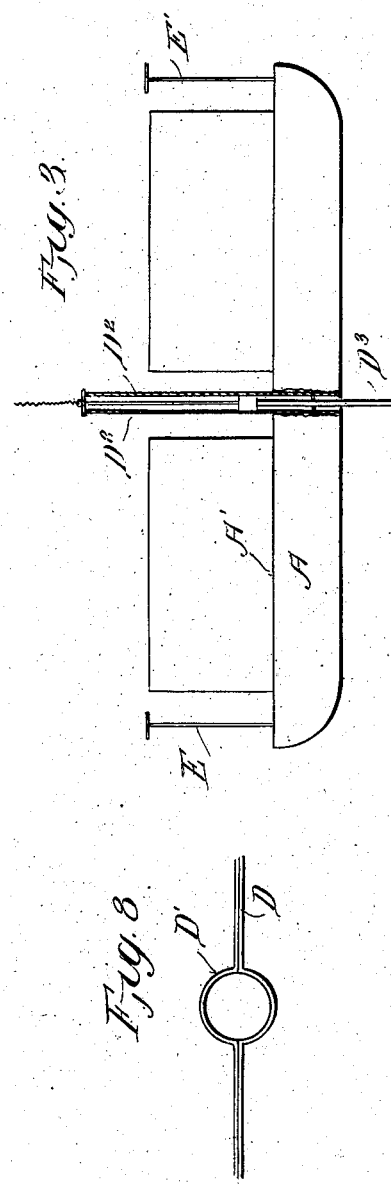
Witnesses
Thomas Durant
Elizabeth Griffith
Inventor
George E. Walton
By Church & Church
His Attorneys No. 893,116. PATENTED JULY 14, 1908.
G. E. WALTON.
SHIP.
APPLICATION FILED JULY 16, 1907.
3 SHEETS—SHEET 3.
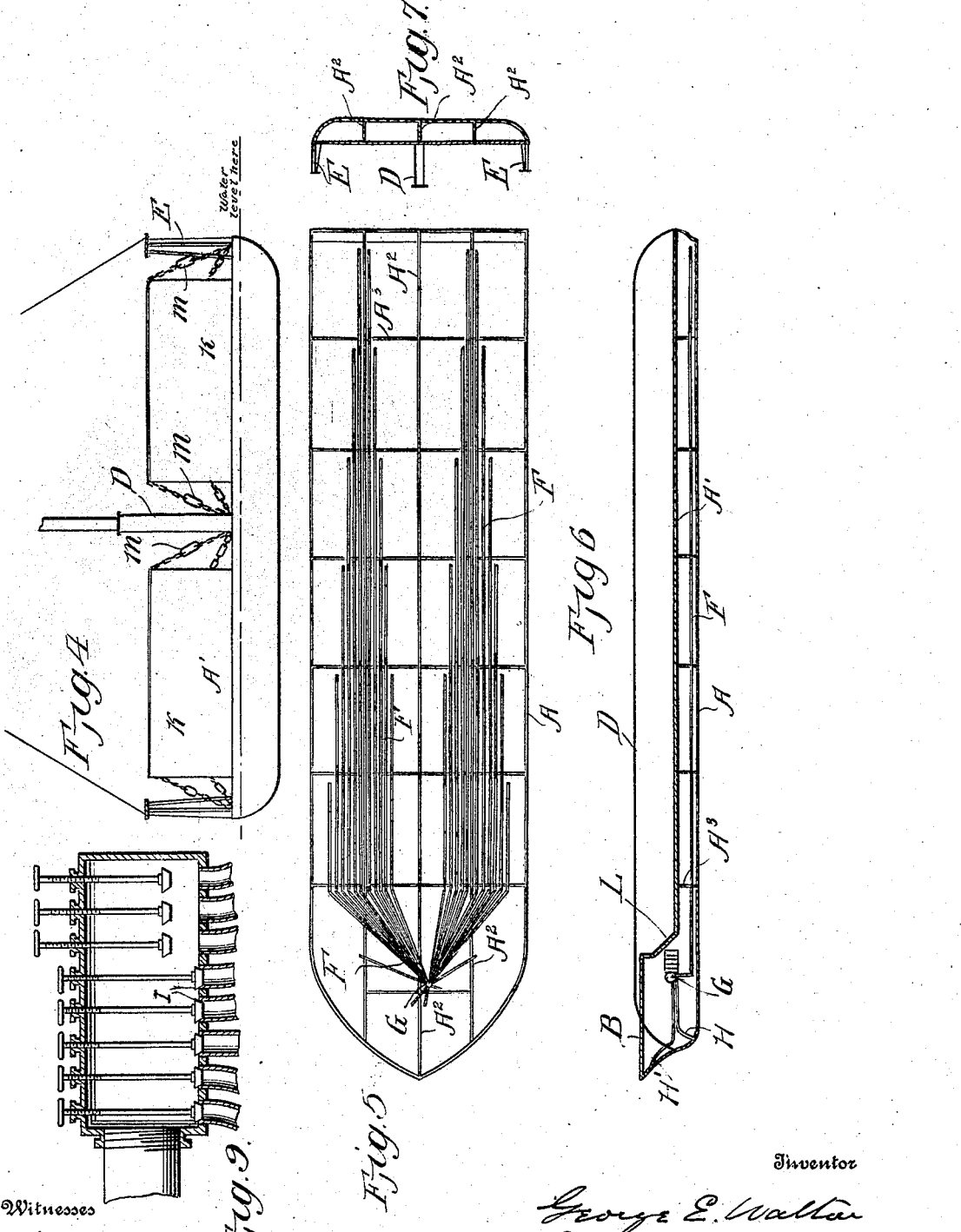
Witnesses
Thomas Durant
Elizabeth Trippett
Inventor
George E. Walton
By Church & Church
his Attorneys

UNITED STATES PATENT OFFICE.

GEORGE E. WALTON, OF DAYTONA, FLORIDA.

SHIP.

No. 893,116.

Specification of Letters Patent.

Patented July 14, 1908.

Application filed July 16, 1907. Serial No. 383,985.

*To all whom it may concern:*

Be it known that I, GEORGE E. WALTON, of Daytona, in the county of Volusia, State of Florida, have invented a certain new and useful Improvement in Ships; and I do hereby declare the following to be a full, clear, and exact description of the same, reference being had to the accompanying drawings, forming a part of this specification, and to the figures and letters of reference marked thereon.

The object of the present invention is primarily to provide a means whereby goods or merchandise, lumber for instance, may be loaded and transported without breaking bulk or re-handling when the line of transportation includes shallow as well as deep water navigation.

It is well understood that cargo vessels such as barges adapted for shallow water navigation cannot be successfully handled at sea and consequently where lines of transportation include both shallow and deep water navigation it is customary to break bulk and transfer the goods, particularly lumber, from a vessel adapted for deep water navigation to one adapted for shallow water navigation or vice versa, as occasion demands. In accordance with the present invention, however, shallow water vessels such as barges receive and contain the cargo throughout the whole transportation route or line, a number of such shallow water vessels or barges being combined with a hull to form a vessel adapted for deep water navigation in traversing those portions of the route where shallow water vessels cannot be economically or successfully handled as separated units.

In carrying the invention into practice there is provided a vessel of proper under water formation to adapt it for deep water navigation, but having no deck housing, save at the bow, whereby it is adapted to receive in orderly arrangement a series of barges, such barges when in place forming the superstructure of the vessel hull. To facilitate the assembling or loading of the barges on the deep water hull and the unloading of the same when the barges are to be used as separated units for shallow water navigation, the deep water hull is adapted to be submerged to a point where the barges may be floated into or out of position, the submergence or raising of the hull being effected by the filling or emptying of watertight compartments in the hull itself.

The type of vessel adapted for illustrating the invention corresponds generally to a schooner, that is to say, it is schooner rigged but it will be understood that the propelling power may be sails of any preferred character or in fact any preferred known motive power may be employed.

In the accompanying drawings: Figure 1 is an outline side elevation of a vessel embodying the present improvements. Fig. 2 is a similar top plan with the masts and rigging omitted. Fig. 3 is a rear elevation partly in section to show a center board well. Fig. 4 is a rear elevation showing a preferred means for holding the barges in place on the hull. Fig. 5 is a diagrammatic plan showing the arrangement of water tight compartments and pipes for filling and emptying the same. Fig. 6 is a longitudinal and Fig. 7 a transverse section through the hull. Fig. 8 is a detail of a portion of the center truss showing the mast socket or sleeve. Fig. 9 is a detail diagrammatic view showing one arrangement of the valves between the pump and pipes leading to the compartments in the hull.

Like letters of reference in the several figures indicate the same parts.

The hull A of the vessel adapted for deep water navigation in the open sea is preferably somewhat shallow from the water line down but may be of any approved under water form, the bow portion at B also in general conforming to approved vessel form for the purpose of opening the water and breaking the force of head waves. The bow, forebody or bow housing B, of the hull, preferably extends in the form of ordinary vessels above the water line back to the beginning of the run of the vessel or to the end of the entrance. From that point to the stern a substantially flat deck A' is provided, which seals or forms the top of the hull compartments into which the hull is divided by longitudinal and transverse partitions $A^2$ and $A^3$ as shown clearly in Figs. 5, 6 and 7.

To give the necessary strength and rigidity especially where the body of the hull is shallow, longitudinal trusses extending above the deck line are provided. The trusses are preferably continuous from the bow to the stern and are preferably three in number, although a greater or less number may be employed depending upon the length and width of the hull and the rigidity desired. Where three trusses are employed as shown in the drawings, one D is located as near as may be on the longitudinal center line of the hull and is usually of such width or height as to extend from the keel through and to a considerable distance above the deck. This central truss is, where the vessel is propelled by sail power, provided with sockets or collars for the masts as indicated in detail at D' in Fig. 8. In addition, the center truss may also form the well or wells for the center board or center boards, the truss being simply made with double walls $D^2$ spaced apart for the reception of the center board $D^3$ as illustrated in Fig. 3, but it is obvious that the separated double wall construction need only extend for a fraction of the length of the truss, or for a sufficient distance only to form the wells and thus the rigidity of the structure as a whole is not perceptibly lessened. The side trusses E are preferably located in proximity to the edges of the deck and where trusses having plate webs are employed, as in the preferred construction, such trusses form a side free board above the deck line, thereby increasing the sea worthiness of the craft. At the forward end the side trusses may merge into the bow housing, the whole structure thus being of a double trough like formation open at the stern but closed at the bow.

Pipes F lead from the bow housing or compartment to each of the water tight hull compartments and by means of a pumping apparatus at G any of said compartments may be filled or emptied at will. An intake H below and a discharge H' above the water line are provided for the pumping apparatus together with separate valves as indicated at I, in Fig. 9, for each of the pipe connections, whereby the supply to each and all of the compartments may be regulated.

The barges K, six of which are adapted to form part of the vessel when in condition for deep water navigation, are preferably of such form as to assemble compactly or without wide intervening spaces, thus the bow ends of the barges may fit closely or conform to the rear of the bow housing as shown at L, in Fig. 1, and the barges are held firmly in place by fastening devices of approved character, such, for instance, as the chain and turn buckle arrangement m, shown in Fig. 4 of the drawings.

When it is desired to assemble the barges on or remove them from the hull, sufficient of the compartments in the latter are filled to submerge the hull to a depth where the barges may be floated into or out of position. The barges are moved into or out of position between the trusses from the stern of the hull and it is obvious that they may be filled with cargo or empty inasmuch as the hull may be submerged until a sufficient depth of water is over the flat upper deck to float the barges.

When the barges and hull are assembled and secured with cargo in place ready for navigation in the open sea it is preferred that the deck shall be above the water line and hence the hull is made to have sufficient displacement when the compartments are empty to carry the barges free from the water, but it is obvious that a high free board for the hull, other than as afforded by the side trusses, is unnecessary.

In stowing the cargo it is obvious that the barges need not necessarily be removed from the hull, thus the vessel may be loaded as is any ordinary deep water vessel and instead of discharging the cargo when the shallow water portion of the route is reached, the barges are floated off and continue as separated units with the cargo of each intact, to the point of destination, other barges, if desired, being placed on the hull to keep the vessel in service.

Having thus described my invention, what I claim as new and desire to secure by Letters Patent, is:—

1. A navigable cargo carrying vessel embodying a wide shallow submergible hull divided into water tight compartments and having a substantially flat deck normally above the water line, longitudinally extending trusses projecting above the deck level to resist longitudinal flexure, a permanent superstructure above the deck level at the bow forming a bow housing, a cargo receiving superstructure formed by separate cargo receiving barges mounted on the deck and means for removably securing said barges in position whereby the hull may be submerged and the barges floated off and utilized as separate units.

2. A navigable cargo carrying vessel embodying a wide shallow submergible hull divided into watertight compartments and having a substantially flat deck normally above the water line, longitudinally extending trusses at the center and both sides projecting above the deck level to resist longitudinal flexure, a permanent superstructure above the deck level at the bow forming a bow housing, a cargo receiving superstructure formed by separate cargo receiving barges mounted on the deck at each side of the center truss and between the side trusses and means for removably securing said barges in place on the deck, whereby the hull may be submerged and the barges floated off and utilized as separate units.

3. A vessel of the character described embodying a submergible hull having a substantially flat deck, a bow housing above the level of the deck, a central longitudinal plate web truss extending from end to end and from the bottom of the hull through the deck and to a considerable height above the same, said truss having walls spaced apart and forming a center-board well, and a center-board in said well.

4. A vessel of the character described embodying a submergible hull having a substantially flat deck, a bow housing above the level of the deck, a central and side longitudinal plate trusses extending from end to end of the hull to form barge receiving spaces between them in rear of the bow housing, and top hamper for the propelling means carried by the center truss.

GEORGE E. WALTON.

Witnesses:
ALEXANDER S. STEWART,
THOMAS DURANT.